(12) United States Patent
Hasebe et al.

(10) Patent No.: US 6,385,726 B1
(45) Date of Patent: *May 7, 2002

(54) SOFTWARE LICENSE PROTECTION VIA CRYPTOGRAPHY

(75) Inventors: Takayuki Hasebe; Naoya Torii; Masahiko Takenaka, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,676

(22) Filed: Mar. 20, 1997

(30) Foreign Application Priority Data

Aug. 22, 1996 (JP) .............................. 8-221412

(51) Int. Cl.⁷ ................................. G06F 1/24
(52) U.S. Cl. .................. 713/182; 713/670; 380/21
(58) Field of Search .............. 380/21; 705/26, 705/59; 713/170, 182

(56) References Cited

U.S. PATENT DOCUMENTS

| | | | | |
|---|---|---|---|---|
| 4,937,863 A | * | 6/1990 | Robert et al. | 380/4 |
| 5,204,897 A | * | 4/1993 | Wyman | 710/200 |
| 5,260,999 A | * | 11/1993 | Wyman | 705/59 |
| 5,343,524 A | * | 8/1994 | Mu et al. | 705/55 |
| 5,438,508 A | * | 8/1995 | Wyman | 705/8 |
| 5,619,247 A | * | 4/1997 | Russo | 348/3 |
| 5,625,690 A | * | 4/1997 | Michel et al. | 380/4 |
| 5,636,277 A | * | 6/1997 | Nagahama | 380/4 |
| 5,745,879 A | * | 4/1998 | Wyman | 705/1 |
| 5,940,504 A | * | 8/1999 | Griswold | 705/59 |

FOREIGN PATENT DOCUMENTS

JP 7-200492 8/1995

* cited by examiner

Primary Examiner—Thomas R. Peeso
(74) Attorney, Agent, or Firm—Staas & Halsey LLP

(57) ABSTRACT

A contents utilizing management apparatus includes a utilizing condition storing unit for storing a utilizing condition corresponding to a sum of money of purchased authorization of contents, a determination unit, coupled to a plurality of computers in which contents are utilized, for determining, based on the utilizing condition of the contents referring to a utilizing request supplied from one of the plurality of computers, whether the contents can be utilized, and a utilizing permission unit for supplying permission to utilize the contents to the one of the plurality of computers when the determination unit determines that the contents can be utilized.

20 Claims, 14 Drawing Sheets

| CONTENTS ID | UTILIZING CONDITION | CONTENTS KEY |
|---|---|---|
| CONTENTS ID - 1 | UTILIZABLE MORE 10 TIMES | KEY 1 |
| CONTENTS ID - 2 | UTILIZABLE TILL OCT. 20, 1996 | KEY 2 |
| CONTENTS ID - 3 | PURCHASED (NOT LIMITED UTILIZATION) | KEY 3 |
| ..... | ..... | ..... |
| CONTENTS ID - n | UTILIZABLE FOR MORE 10 HOURS | KEY n |

FIG. 6

SOFTWARE LICENSE PROTECTION VIA CRYPTOGRAPHY

BACKGROUND OF THE INVENTION (1) Field of the Invention

The present invention generally relates to a system which performs utilizing management of contents such as programs and data and more particularly to a contents utilizing management system by which the utilizing amount of contents can be charged to an account (accounting). The contents utilizing management system is applicable to a meta-distribution system for the contents (software).

(2) Description of the Related Art

A distribution system in which contents (software such as programs and data) and authorization for use of the contents (right for use of the contents) are sold separately, a so called meta-distribution system, has been proposed (see U.S. Pat. No. 4,658,093). The compensation for the authorization of contents depends on the amount of permissible utilization (such as the number of permissible times of utilization, the number of permissible utilization term and the permissible period of time of utilization) of the contents.

In such a meta-distribution system, each of a number of user computers is provided with a utilizing amount management apparatus. A permissible utilizing amount (an initial value), corresponding to a purchase price of the authorization for use of the contents, is set in the utilizing amount management apparatus apart from the contents supplied to each of the user computers via CD-ROMs, networks and the like. Before the contents are used in a user computer, the user computer refers to the utilizing amount management apparatus for whether the permissible utilizing amount has any existing remainder (any remainder number of utilization times, any remainder of the utilization term and any remainder of the utilizing period of time). If any remainder of the permissible utilizing amount exists, the utilizing amount management apparatus grants utilizing permission to the user computer. After the utilizing permission is granted to the user computer, the contents can be utilized in the user computer. The utilizing amount management apparatus updates the permissible utilizing amount in accordance with an actual utilizing mode such that utilizing permission is granted to the user computer (e.g., one time is subtracted from the permissible number of times of utilization).

On the other hand, if there is no remaining permissible utilizing amount (the remaining utilizing number of times is equal to zero "0", expiration of the permissible utilizing term, or if the remaining utilizing period of time is equal to zero "0"), the utilizing amount management apparatus does not grant utilizing permission to the user computer. The utilization of the contents in the user computer is rejected. In order to further utilize the contents in the user computer, the authorization for use of the contents is purchased and the permissible utilizing amount corresponding to the purchase price is again set in the utilizing amount management apparatus.

In the system described above, the authorization for use of the contents is purchased with a price corresponding to the amount of permissible utilization of the contents, and the permissible utilizing amount is decreased every time the contents are utilized. The contents can be utilized by an amount of utilization (an amount of time, a term or a period of time) corresponding to a sum of money paid for the authorization.

However, in the above system, the utilizing amount management apparatus has to be set to each of the user computers in which the contents can be utilized. Thus, in a case of a company in which the contents are utilized in a plurality of (a large number of) computers in a local network, a large number of utilizing amount management apparatuses which should be set to the respective computers are needed. As a result, the cost of constructing the system increases.

SUMMARY OF THE INVENTION

Accordingly, a general object of the present invention is to provide a novel and useful contents utilizing management apparatus in which the disadvantages of the aforementioned prior art are eliminated.

A specific object of the present invention is to provide a contents utilizing management apparatus by which a system charging the utilizing amount for contents utilized in a plurality of computers to accounts can be constructed with as low a cost as possible.

The above objects of the present invention are achieved by a contents utilizing management apparatus comprising: utilizing condition storing means for storing a utilizing condition corresponding to a sum of money of purchased authorization of contents; determination means, coupled to a plurality of computers in which contents are utilized, for determining, based on the utilizing condition of the contents referring to a utilizing request supplied from one of the plurality of computers, whether the contents can be utilized; and utilizing permission means for supplying permission to utilize the contents to the one of the plurality of computers when the determination means determines that the contents can be utilized.

According to the present invention, when a utilizing request for contents is supplied from each of the plurality of computers to the contents utilizing management apparatus, it is determined, based on a utilizing condition of the contents referring to the utilizing request, whether the contents can be utilized. That is, the single contents utilizing management apparatus can receive a utilizing request for the contents from the plurality of computers. It is not necessary to provide the contents utilizing management apparatus to each of the plurality of computers. Thus, a system charging the utilizing amount of contents utilized in the plurality of computers to accounts can be constructed with a cost as low as possible.

Another object of the present invention is to provide a contents utilizing system using the above contents utilizing management apparatus.

The object of the present invention is achieved by a contents utilizing system comprising: a plurality of computers in which contents are utilized; and a contents utilizing management apparatus, connected to the plurality of computers by a local network and connected to a center computer by a predetermined network, for managing utilization of the contents in each of the plurality of computers based on a utilizing condition corresponding to a sum of money of purchased authorization of the contents, the utilizing condition supplied from the center computer, the contents utilizing management apparatus comprising: utilizing condition storing means for storing the utilizing condition corresponding to the sum of money of the purchased authorization of contents; determination means, coupled to the plurality of computers in which contents are utilized, for determining, based on the utilizing condition of the contents referring to a utilizing request supplied from one of the plurality of computers, whether the contents can be utilized; and utilizing permission means for supplying permission to utilize the contents to the one of the plurality of computers when the determination means determines that the contents can be utilized.

According to the present invention, a contents utilizing system using the above contents utilizing management apparatus can be formed.

BRIEF DESCRIPTION OF THE DRAWINGS

Other objects, features and advantages of the present invention will be apparent from the following description when read in conjunction with the accompanying drawings, in which:

FIG. 6 is a table illustrating relationships among contents IDs, permissible utilizing conditions and deciphering keys;

DESCRIPTION OF THE PREFERRED EMBODIMENTS

A description will be given of embodiments of the present invention.

Figure 1:
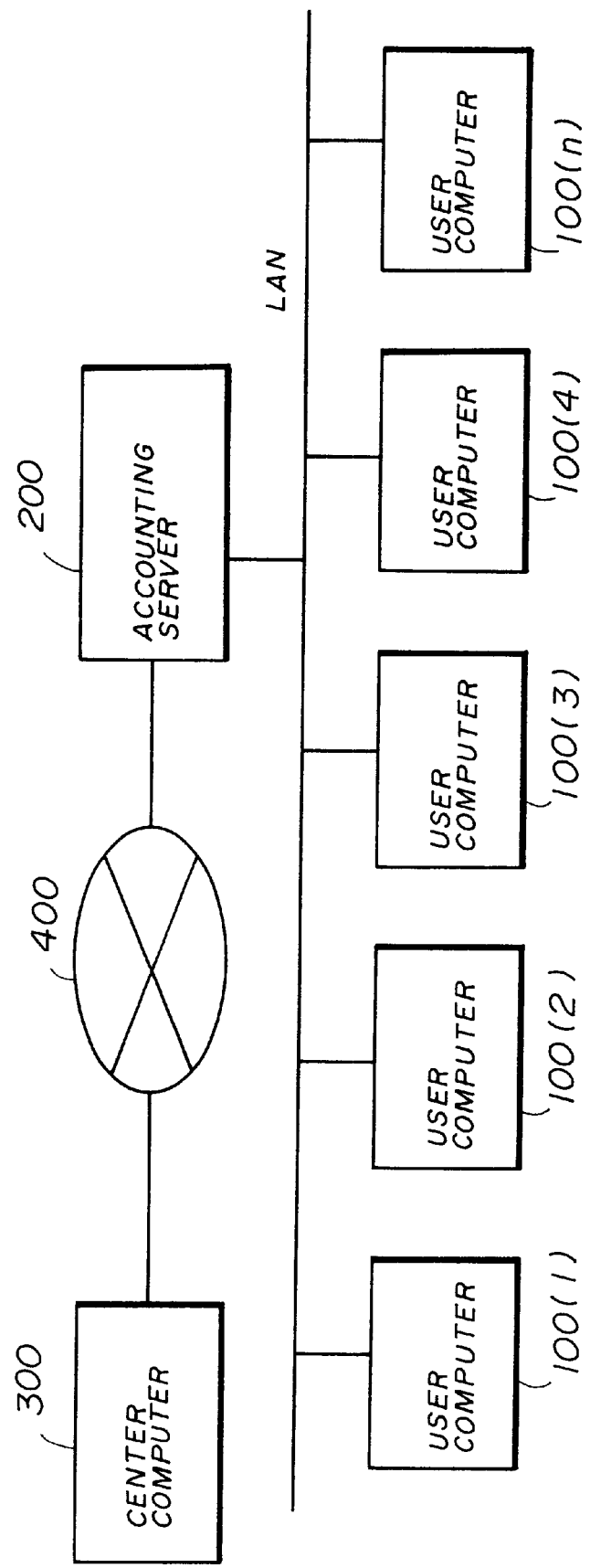
FIG. 1 is a block diagram illustrating a contents utilizing system according to an embodiment of the present invention.

A contents utilizing system which is a part of a meta-distribution system for software is formed as shown in FIG. 1.

Referring to FIG. 1, the system has a plurality of user computers $100(1)$, $100(2)$, ... and $100(n)$ and an accounting server 200 all of which are connected by a local network (LAN). Contents (software) are utilized in the respective user computers $100(1)$, $100(2)$, ... and $100(n)$. The accounting server 200 manages utilization of contents in the respective user computers. The accounting server 200 is coupled to a center computer 300 by a predetermined network 400 (e.g., a public network). Each of the user computers $100(1)$, $100(2)$, ... and $100(n)$ is supplied with contents, such as programs and data, by a CD-ROM. The contents supplied by using the CD-ROM are ciphered by using a predetermined key. The accounting server 200 corresponds to the contents utilizing management apparatus according to the present invention.

Figure 2:
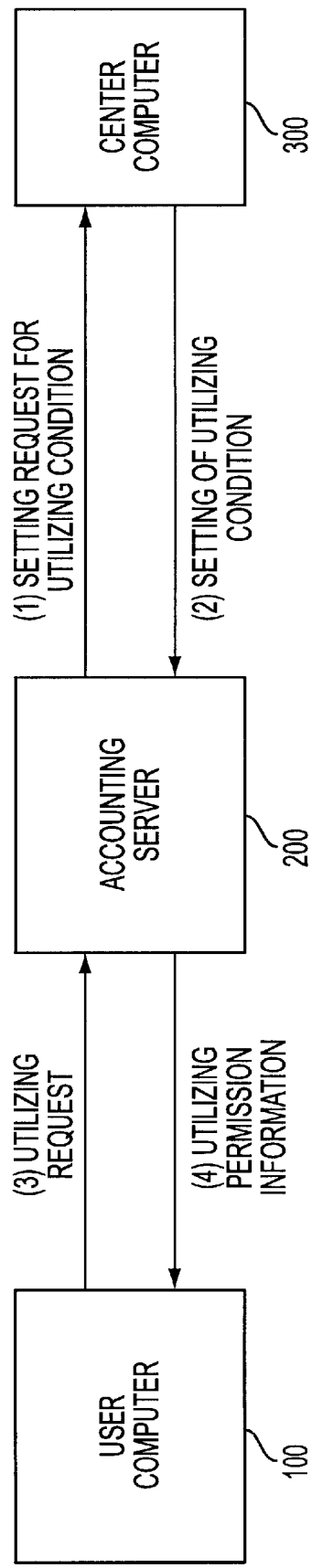
FIG. 2 is a block diagram illustrating a processing flow in the contents utilizing system shown in FIG. 1.

In the contents utilizing system as described above, processes regarding the utilization of the contents are executed, for example, in accordance with a procedure shown in FIG. 2.

Referring to FIG. 2, the accounting server 200 transmits to the center computer 300 a setting request for a utilizing condition (e.g., a permissible number of utilizing times) to purchase the authorization of the respective contents (1). The center computer 300 performs an accounting process for charging a price corresponding to the utilizing condition to an account of a managing post. For example, a process for withdrawing an amount of money corresponding to the utilizing condition of the contents from the account of the managing post. The center computer 300 then sets the utilizing condition and sends the utilizing condition to the accounting server 200. The setting of the utilizing condition should be performed by only the center computer 300. Thus, the center computer 300 enciphers the utilizing condition using a key particular to the accounting server 200 or transmits the utilizing condition to which a signature is added.

The utilizing conditions of the respective contents which are set by the center computer 300 are maintained in the accounting server 200. After this, the respective contents can be utilized in a user computers 100 under the utilizing conditions.

The user computer 100 transmits a utilizing request to the accounting server 200 to utilize the contents (3) which are continued therein. The accounting server 200, which receives the utilizing request, checks the utilizing condition for the contents by referring to the utilizing request. If the utilizing condition is not set for the contents or if a present condition for the contents does not satisfy the utilizing condition, the accounting server 200 transmits a denial message to the user computer 100 in response to the utilizing request. For example, if the (n+1)-th utilization of the contents for which a number of n times has been set as the utilizing condition is requested, the denial message is transmitted from the accounting server 200 to the user computer 100.

On the other hand, if the present condition for the contents satisfies the utilizing condition, the accounting server 200 transmits utilizing permission information to the user computer 100. For example, a deciphering key for the ciphered contents requested by the user computer 100 is supplied as the utilizing permission information to the user computer 100 in response to the utilizing request. The user computer 100 deciphers, using the deciphering key, the contents which are separately supplied by the CD-ROM and performs a process using the deciphered contents.

A detailed description will now be given of the system having the above structure.

Figure 3:
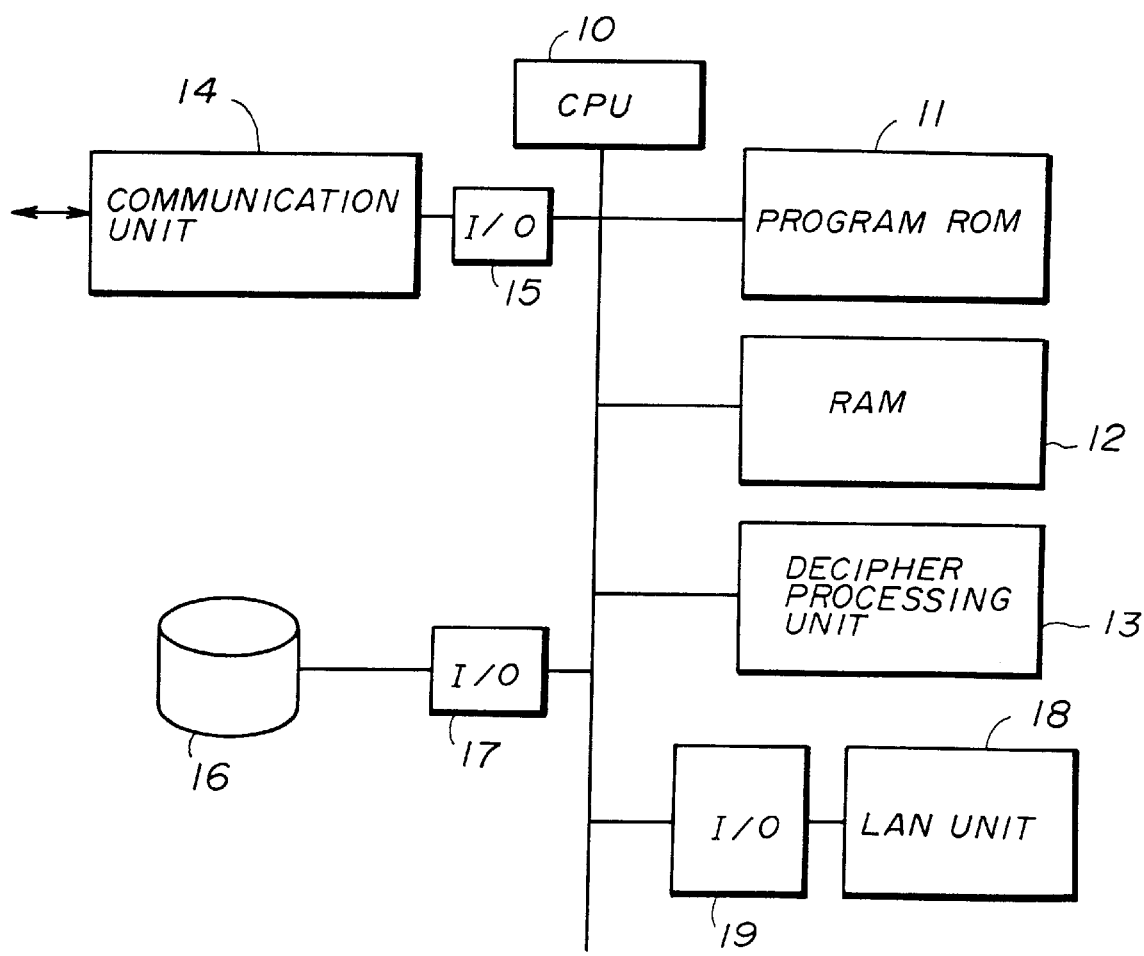
FIG. 3 is a block diagram illustrating an example of hardware of an accounting server provided in the system shown in FIG. 1.

The hardware of the accounting server 200 is formed as shown in FIG. 3. Referring to FIG. 3, the accounting server 200 has a CPU (Central Processing Unit) 10, a program ROM (Read Only Memory) 11, a RAM (Random Access Memory) 12, a decipher processing circuit 13, a communication unit 14, a disc unit 16, a LAN unit 18 and a CD-ROM driver 20. The CPU 10 performs a process for the contents utilizing management according to the present invention and controls the accounting server 200. The program ROM 11 stores fundamental programs such as an OS. The RAM 12 stores data obtained in processes executed by the CPU 10 and application programs corresponding to the processes. The decipher processing circuit 13 deciphers ciphered contents using a deciphering key.

The communication unit 14 controls communication between the accounting server 200 and the center computer 300 via the network 400. Transmitting information (e.g., a utilizing condition setting request) supplied from the CPU 10 via an interface 15 is transmitted from the communication unit 14 to the center computer 300. Receiving information (e.g., utilizing conditions) from the center computer 300 is input from the communication unit 14 to the accounting server 200 via the interface 15.

The disc unit 16 stores various kinds of information and utilizing conditions supplied for the respective contents from the center computer 300. The CPU 10 accesses the disc unit 16 via an interface 17 so as to control reading/writing processes. A program (an application) for the contents utilizing management according to the present invention is installed in the disc unit 16. The program is read out of the disc unit 16 and stored in the RAM 12. The CPU 10 executes the process for the contents utilizing management in accordance with the programs stored in the RAM 12.

The LAN unit 18 performs communication between the accounting server 200 and each of the user computers 100(1), 100(2), . . . and 100(n) via the local network. Receiving information (e.g., a utilizing request) from a user computer 100(i) is supplied from the LAN unit 18 to the CPU 10 via an interface 19. Transmitting information (e.g., utilizing permission/denial information) supplied from the CPU 10 via the interface 19 is transmitted from the LAN unit 18 to a predetermined user computer 100(i).

Figure 4:
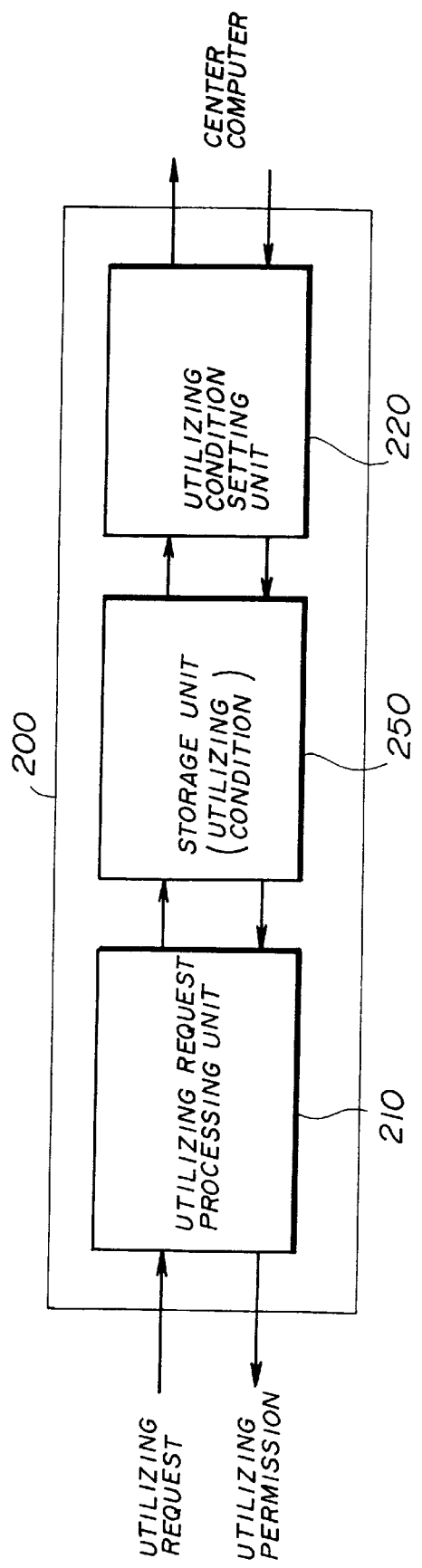
FIG. 4 is a block diagram illustrating a first example of a functional structure of the accounting server.

The accounting server 200 has functions, as shown in FIG. 4, regarding the contents utilizing management. Referring to FIG. 4, the accounting server 200 has a utilizing request processing unit 210, a utilizing condition setting unit 220 and a storage unit 250. The utilizing request processing unit 210 determines whether contents, by referring to utilizing requests from the respective user computers, can be utilized. The determination results (the utilizing permission/denial information) are returned from the utilizing request processing unit 210 to the respective user computers. The utilizing condition setting unit 220 supplies to the center computer 300 setting requests for utilizing conditions. The utilizing conditions transmitted in response to the setting requests by the center computer 300 are received by the utilizing condition setting unit 220. The utilizing conditions received from the center computer 300 for the respective contents are stored in the storage unit 250.

The utilizing request processing unit 210 and the utilizing condition setting unit 220 correspond to the functions of the CPU 10 operating in accordance with the programs regarding the contents utilizing management.

Figure 5:
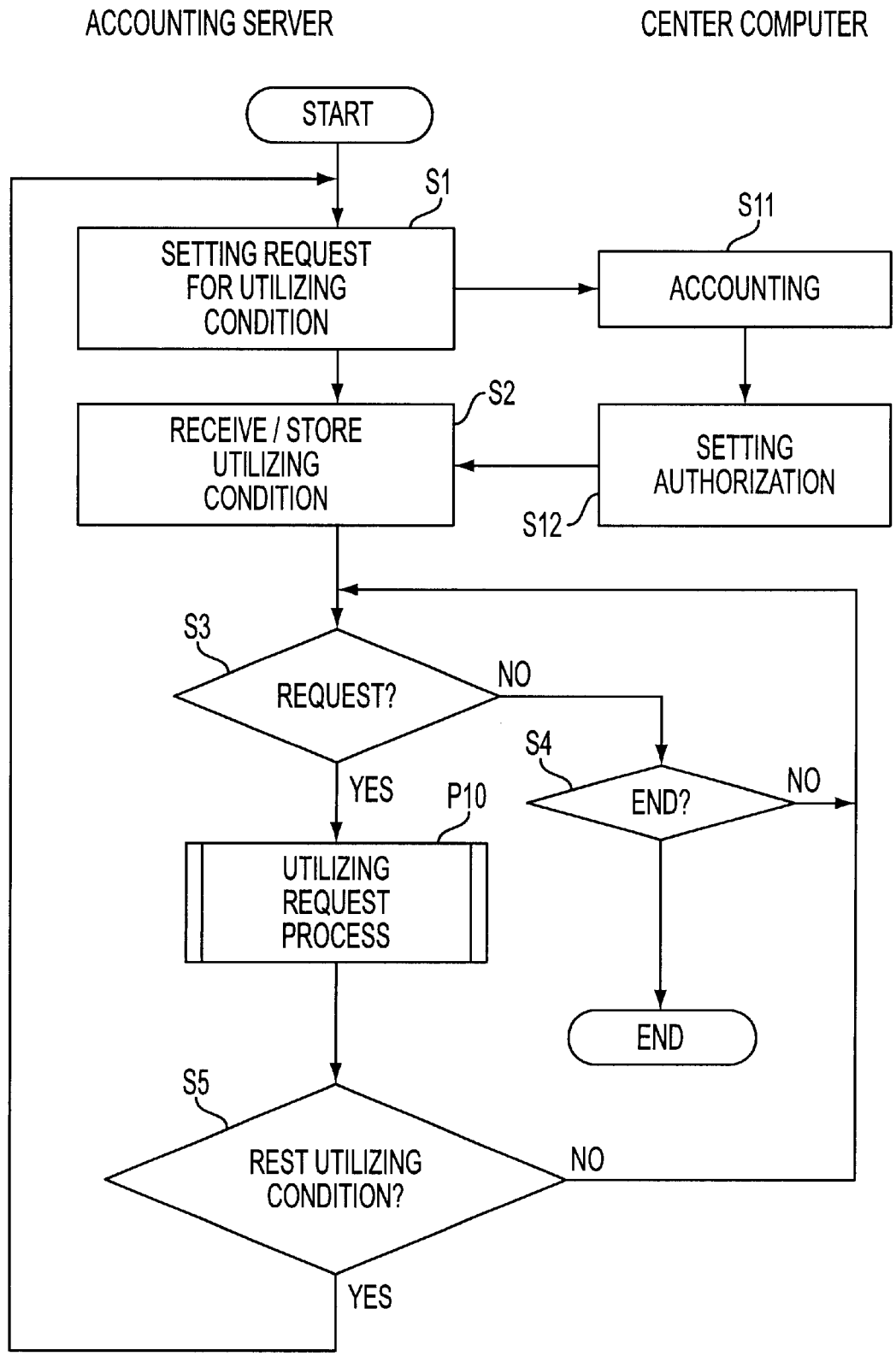
FIG. 5 is a flowchart illustrating a process executed in the accounting server.

The accounting server 200, having the functions described above, performs the processes in accordance with a procedure as shown in FIG. 5.

Referring to FIG. 5, the CPU 10 of the accounting server 200 performs a transmission process for transmitting a setting request for the utilizing condition of contents which should be utilized in the system (S1). As a result, the setting request for the utilizing condition is transmitted from the communication unit 14 to the center computer 300 via the network 400. The utilizing condition is represented, for example, as "a permissible number of utilizing times of contents (a)", "a permissible utilizing period of time of contents (b)", or "a permissible utilizing term of contents (c)". A utilizing condition under which contents can be utilized without limitation can be set.

The center computer 300, which receives the setting request for the utilizing condition of the contents, performs an accounting process for charging a sum of money corresponding to the utilizing condition according to the setting request. In the accounting process, the sum of money is withdrawn from an account of a managing post of this contents utilizing system (see FIG. 1). The center computer 300 then performs a process for setting, authorization of the contents under the utilizing condition according to the setting request (S12). In this process, information regarding the utilizing condition of the contents is ciphered using a key peculiar to the accounting server 200. The ciphered information is transmitted from the center computer 300 to the accounting server 200 via the network 400.

The communication unit 14 of the accounting server 200 receives the ciphered information from the center computer 300. The CPU 10 deciphers the received information using the key so as to reproduce the utilizing condition of the contents. The utilizing condition of the contents is then stored in the disc unit 15 (corresponding to the storage unit 250 shown in FIG. 4) (S2).

The utilizing condition of the contents is stored as a table, shown in FIG. 6, in the disc unit 15. In the table, contents IDs identifying the contents respectively correspond to utilizing conditions represented as "a permissible number of utilizing times is 10", "a permissible utilizing term is valid till Oct. 20, 1996", "a permissible period of utilizing time is 10 hours" and the like. Further, the table indicates contents keys corresponding to the contents IDs. Each of the contents keys is needed to decipher the contents identified by a corresponding contents ID.

Returning to FIG. 5, after the utilizing condition is stored in the disc unit 16 (corresponding to the storage unit 250), the CPU 10 of the accounting server 200 determines whether a utilizing request for contents has been supplied from a user computer (S3). The CPU 10 further determines whether a predetermined terminating operation has been performed (S4). When the CPU 10 determines that the utilizing request for contents has been supplied from a user computer, the CPU 10 executes a utilizing request process P10. A detailed description of the utilizing request process 10 will be given later.

After the utilizing request process 10 is completed, the CPU 10 determines whether a utilizing condition (authorization) for the contents should be reset. For example, in cases where the permissible utilizing number of time reaches "0", the permissible utilizing period of time reaches "0" hour and the permissible utilizing term is terminated, it is determined that the utilizing condition for the contents should be reset. When it is determined that the utilizing condition for the contents should be reset, the process returns to step S1, and the process for setting the utilizing condition is executed (S1 and S2).

In the above processes, every time the accounting server 200 receives a utilizing request from a user computer, the utilizing request process P10 is executed. In addition, if the predetermined terminating operation is performed, the CPU 10 terminates the process of the contents utilizing management.

The above utilizing request process P10 is executed by the utilizing request processing unit 210 of the accounting server 200. The utilizing request processing unit 210 has a functional structure as shown in FIG. 7.

Figure 7:
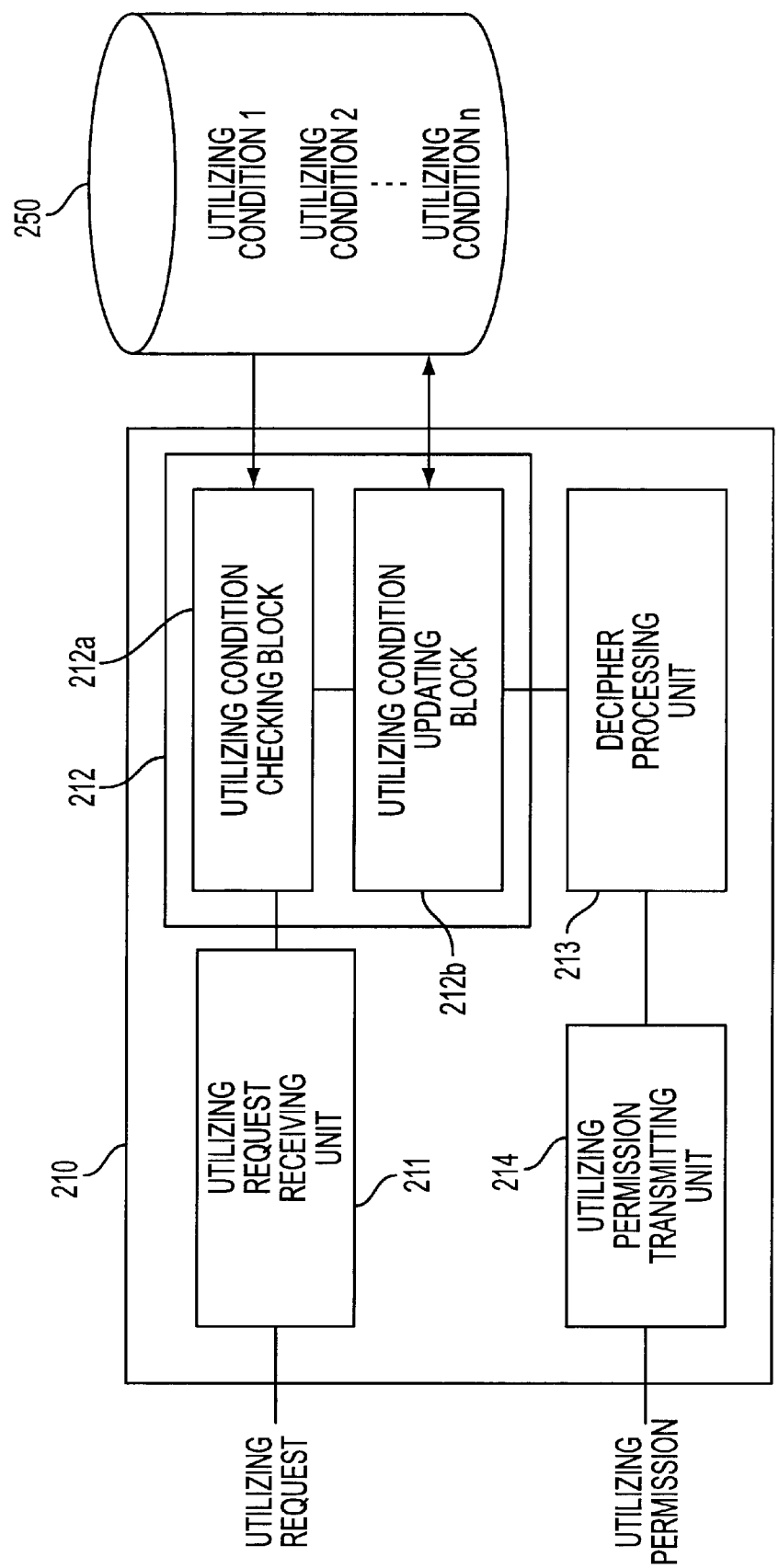
FIG. 7 is a block diagram illustrating an example of a detailed functional structure of a utilizing request processing unit of the accounting server shown in FIG. 4.

Referring to FIG. 7, the utilizing request processing unit 210 has a utilizing request receiving unit 211, an account processing unit 212, a decipher processing unit 213, and a utilizing permission transmitting unit 214. The utilizing request receiving unit 211 corresponds to a receiving function of the LAN unit 18 shown in FIG. 3. The utilizing request receiving unit 211 receives utilizing requests for the contents from the respective user computers. The account processing unit 212 is formed of a utilizing condition checking block 212a and a utilizing condition updating block 212b. The utilizing condition checking block 212a and the utilizing condition updating block 212b correspond to functions of the CPU 10 which operate in accordance with the programs of the contents utilizing management. The utilizing condition checking block 212a checks, based on the utilizing condition of the contents (see FIG. 6) stored in the storage unit 250 (corresponding to the disc unit 16 shown in FIG. 3), whether the contents referring to the received utilizing request can be utilized now. When the utilizing condition checking block 212a determines that the contents referring to the received utilizing request can be utilized, the utilizing condition updating block 212b updates the utilizing condition stored in the storage unit 250 so that a utilizing amount for this time is subtracted from the permissible utilizing amount based on the utilizing condition. For example, in a case where a permissible utilizing amount of times is defined as the utilizing condition, the permissible utilizing amount of time is decreased by one.

The decipher processing unit 213 corresponds to the decipher processing circuit 13 shown in FIG. 3. The decipher processing unit 213 deciphers, using a corresponding contents key (see FIG. 6), the contents which are determined to be able to be utilized by the utilizing condition checking block 212a. The utilizing permission transmitting unit 214 corresponds to the transmission function of the LAN unit 18 shown in FIG. 3. The utilizing permission transmitting unit 214 transmits a response corresponding to the checking result obtained by the utilizing condition checking block 212a, to a user computer from which the utilizing request has been received by the accounting server 200. When the utilizing condition checking block 212a determines that the contents referring to the utilizing request can not be utilized, the utilizing permission transmitting unit 214 transmits information of the non-permissible utilization to the user's computer. On the other hand, when the utilizing condition checking block 212a determines that the contents referring to the utilizing request can be utilized, the utilizing permission transmitting unit 214 transmits the contents which are deciphered by the decipher processing unit 213 to the user computer.

Figure 8:
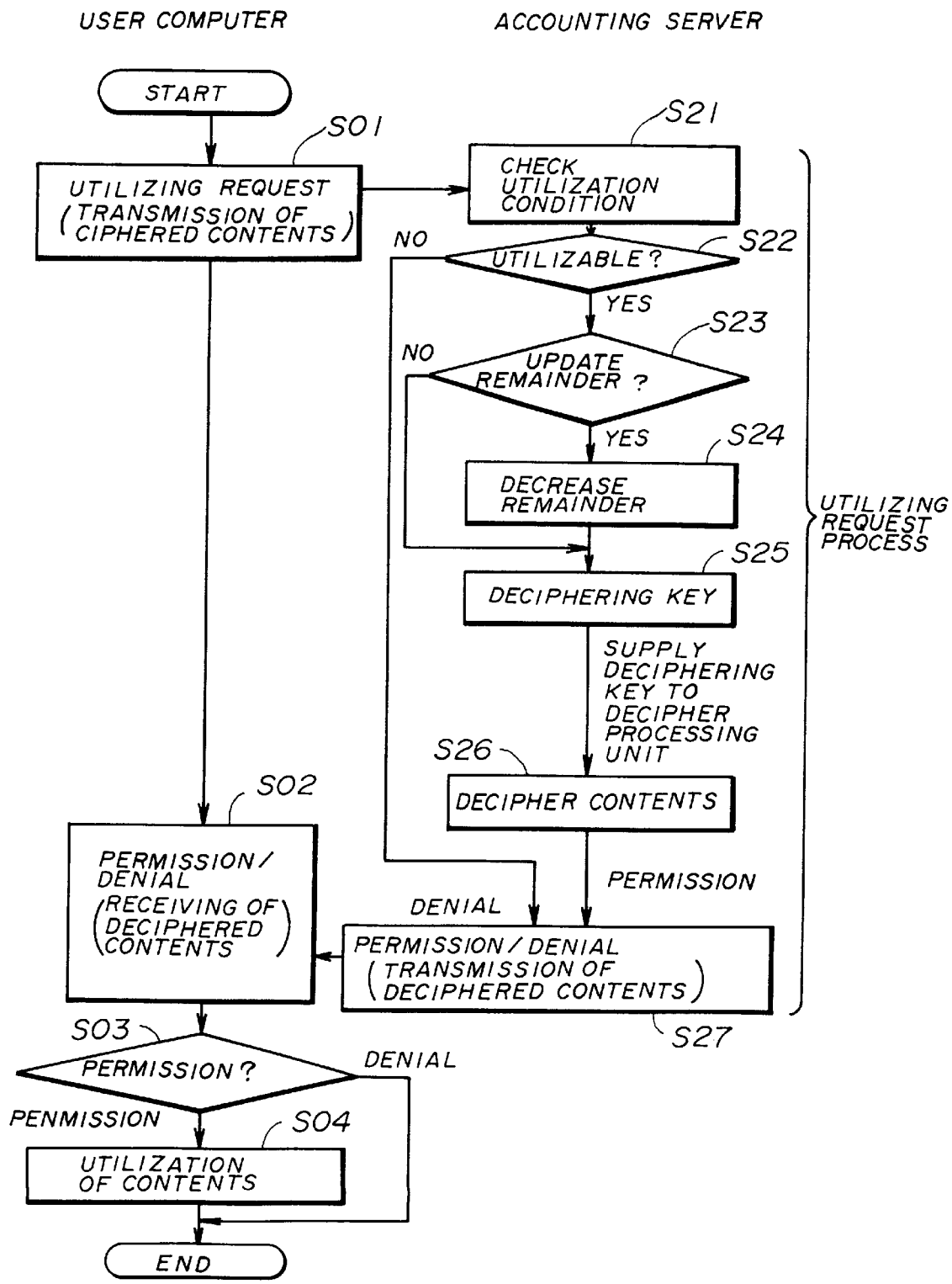
FIG. 8 is a flowchart illustrating processes executed in a user computer and the accounting server.

The utilizing request process P10 is performed in accordance with a procedure as shown in FIG. 8.

The respective user computers have been previously supplied with various contents (software) which have been ciphered. To utilize contents in a user computer, the ciphered contents and a utilizing request for the contents are transmitted from the user computer to the accounting server 200 (S01). The LAN unit 18 of the accounting server 200 receives the ciphered contents and the utilizing request from the user computer. The CPU 10 then checks the utilizing condition of the contents referring to the utilizing request, with reference to the table (see FIG. 6), indicating the relationships between the contents and the utilizing conditions, stored in the disc unit (S21). The CPU 10 determines, based on the checking result, whether the contents can be utilized (S22).

If the present state regarding the utilization of the contents does not satisfy the utilizing condition, the CPU 10 determines that the contents can not be utilized. For example, if the total number of utilizing times of the contents for which a permissible utilizing number of times is set as the utilizing condition (see the contents ID-1 in FIG. 6) has reached the permissible number of utilizing times, and if a permissible utilizing term of the contents (see the contents ID-2 in FIG. 6) has expired, it is determined that the contents cannot be utilized. In these cases, the LAN unit 18 transmits the denial information, based on instructions from the CPU 10, to the user computer from which the utilizing request has been received (S27).

On the other hand, if the present state regarding the utilization of the contents satisfies the utilizing condition, the CPU 10 determines that the contents can be utilized. For example, if the total number of utilizing times of the contents for which a permissible number of utilizing times is set as the utilizing condition has not yet reached the permissible number of utilizing times, and if a permissible utilizing term has not yet expired, it is determined that the contents are permitted to be utilized. In these cases, the CPU 10 further determines whether the utilizing condition for the contents should be updated (S23).

For example, in a case where a permissible number of utilizing times of the contents is set as the utilizing condition, it is determined that the utilizing condition should be updated. That is, every time the contents are permitted to be utilized, the permissible number of utilizing times is decreased by one. The accounting server 200 always maintains the remaining number of the permissible number of utilizing times. When the remainder of the permissible number of utilizing times reaches zero "0", the contents are prohibited from being utilized. For example, in a case where a permissible utilizing term is set as the utilizing condition, it is determined that the utilizing condition need not to be updated.

If it is determined that the utilizing condition (e.g., the permissible number of utilizing times) should be updated, the CPU 10 updates the utilizing condition so that a utilized amount of this time is subtracted from the permissible utilizing amount corresponding to the utilizing condition (S24).

After this, the CPU 10 provides a key used to decipher the contents which have been permitted to be utilized from the table (see FIG. 6) stored in the disc unit 16 (S25). The key is supplied to the decipher processing circuit 13 (the decipher processing unit 213). The decipher processing circuit 13 deciphers the ciphered contents using the key supplied thereto (S26). Based on instructions from the CPU 10, the LAN unit 18 then transmits the deciphered contents and information of the utilizing permission to the user computer from which the utilizing request has been received.

After transmitting the ciphered contents and the utilizing request to the accounting server 200 (S01), the user computer is in a waiting state. After this, the user computer receives the response to the utilizing request from the accounting server 200 (S02). The user computer determines whether the response corresponds to the utilizing permission or the utilizing nonpermission (S03). If the response corresponds to the utilizing permission, the contents (which have been deciphered) and the response information transmitted from the accounting server 200 are loaded in the user computer. After this, the contents (an application) are utilized in the user computer (S04).

On the other hand, if the response corresponds to the utilizing denial, a message indicating that the contents can not be utilized is displayed on a display unit of the user computer. The user computer terminates the process for the utilizing request.

In the above system, the accounting server 200 receives the utilizing requests from the plurality of users's computers 100(1), 100(2), . . . and 100(n). In response to each of the utilizing requests, the accounting server 200 determines, based on the utilizing condition corresponding to the amount of money of the purchased authorization of the contents, whether or not the contents are permitted to be utilized. That is, the contents utilizing management for the plurality of user computers can be carried out by the single accounting server 200 (not a plurality of management apparatuses provided for the respective user computers). The system can be constructed at a low cost. It is not necessary for the respective user computers to directly communicate with the center computer 300 to utilize the contents. Thus, the communication cost in the system can be reduced.

Figure 9:
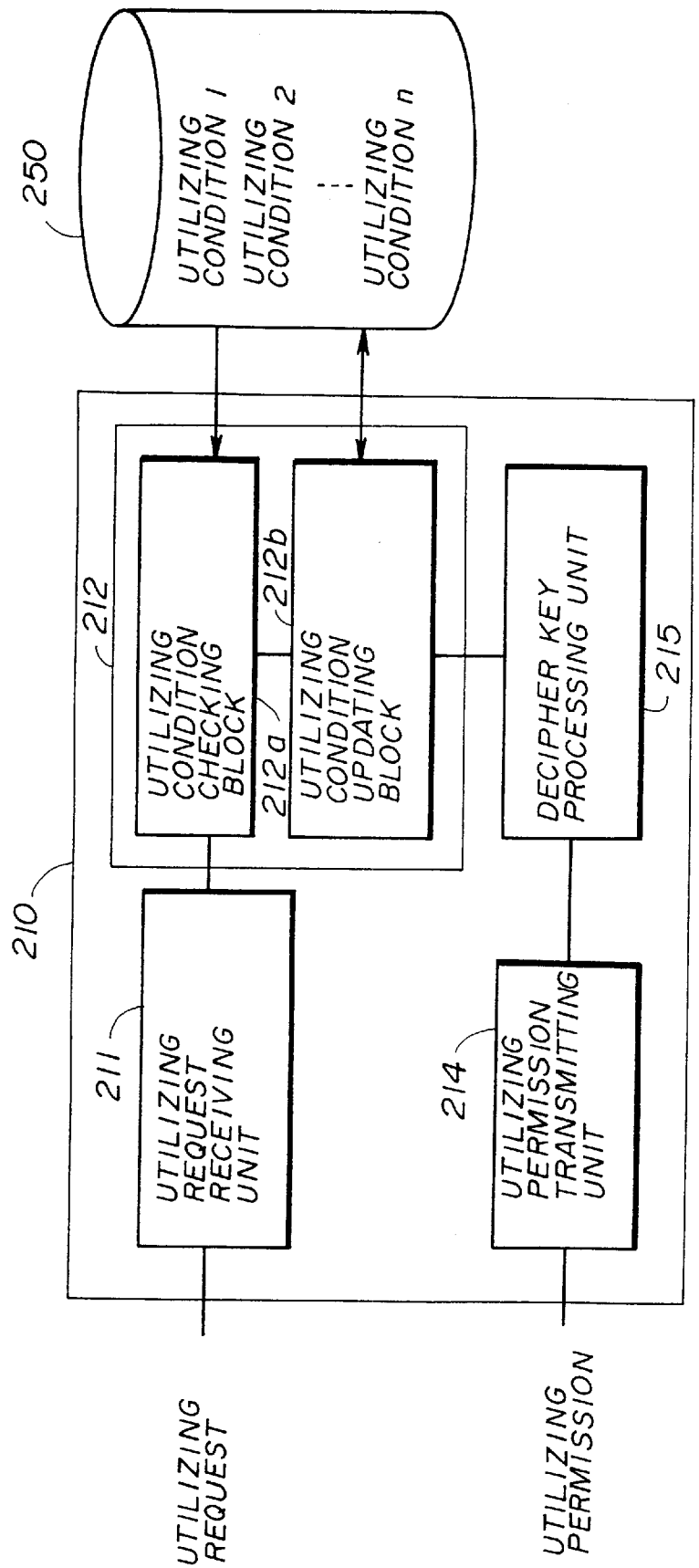
FIG. 9 is a block diagram illustrating another example of a detailed functional structure of the utilizing request processing unit of the accounting server shown in FIG. 4.

The utilizing request processing unit 210 may have a functional structure as shown in FIG. 9, substituting for the functional structure shown in FIG. 7.

In this example, a decipher key processing unit 215 is substituted for the decipher processing unit 213 shown in FIG. 7. The decipher key processing unit 215 corresponds to a function of the CPU 10 which operates in accordance with the programs of the contents utilizing management. The decipher key processing unit 215 performs a process for ciphering a deciphering key for the contents which have been permitted to be utilized in response to the utilizing request.

Figure 10:
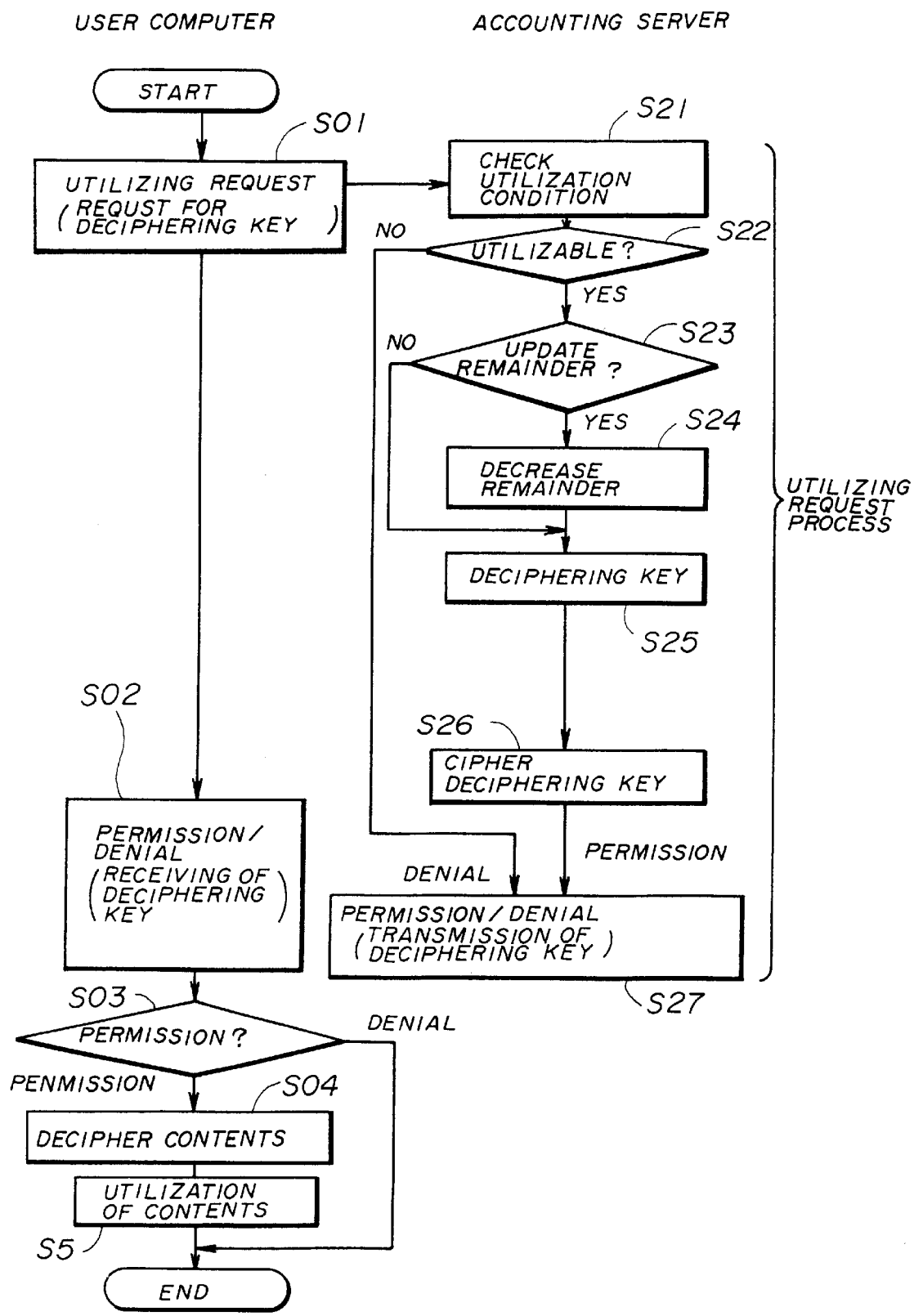
FIG. 10 is a flowchart illustrating processes executed in a user computer and the accounting server.

In a case whether the utilizing request processing unit 210 of the accounting server 200 has the functional structure as described above, the process for the contents utilizing management is executed in accordance with a procedure as shown in FIG. 10. Referring to FIG. 10, to utilize contents in a user computer, the user computer transmits a contents ID identifying contents and a utilizing request to the accounting server 200 (S01). The accounting server 200 which receives the utilizing request checks the utilizing condition of the contents referring to the utilizing request (S21) and determines whether the contents can be utilized (S22), in the same manner as in the case shown in FIG. 8. If the contents can not be utilized, the information of the denial is transmitted from the LAN unit 18 to the user computer.

On the other hand, in a case where the contents can be used, if it is necessary to update the utilizing condition of the contents referring to the utilizing request, the utilizing condition is updated (S23). After this, the CPU 10 obtains a deciphering key for the contents referring to the utilizing request with reference to the table (see FIG. 6) indicating the relationships between the contents and the deciphering keys. The CPU 10 then ciphers the deciphering key using a key peculiar to the user computer (S26).

After the deciphering key is ciphered, the LAN unit 18 transmits, based on instructions of the CPU 10, the deciphering key which has been ciphered and information of the utilizing permission to the user computer from which the utilizing request has been received (S27).

The user computer receives a response (utilizing permission/utilizing nonpermission) to the utilizing request (S02). The user computer then determines whether the response is the utilizing permission or the utilizing nonpermission (S03). If the contents are not permitted to be utilized (the utilizing denial of permission), the message for the utilizing denial of permission is displayed on the display unit of the user computer. The contents can not be utilized in the user computer. On the other hand, if the contents are permitted to be utilized (the utilizing permission), the ciphered key received from the accounting server 200 is deciphered using the key peculiar to the user computer. The contents which have been supplied to the user computer are deciphered using the deciphered key (S04). After this, the deciphered contents (an application) are utilized in the user computer (S05).

In the above example, since the contents are not deciphered by the accounting server 200, the processes in the accounting sever 200 can be simplified. Thus, the accounting server 200 can rapidly respond to the utilizing request from each of the user computers.

Figure 11:
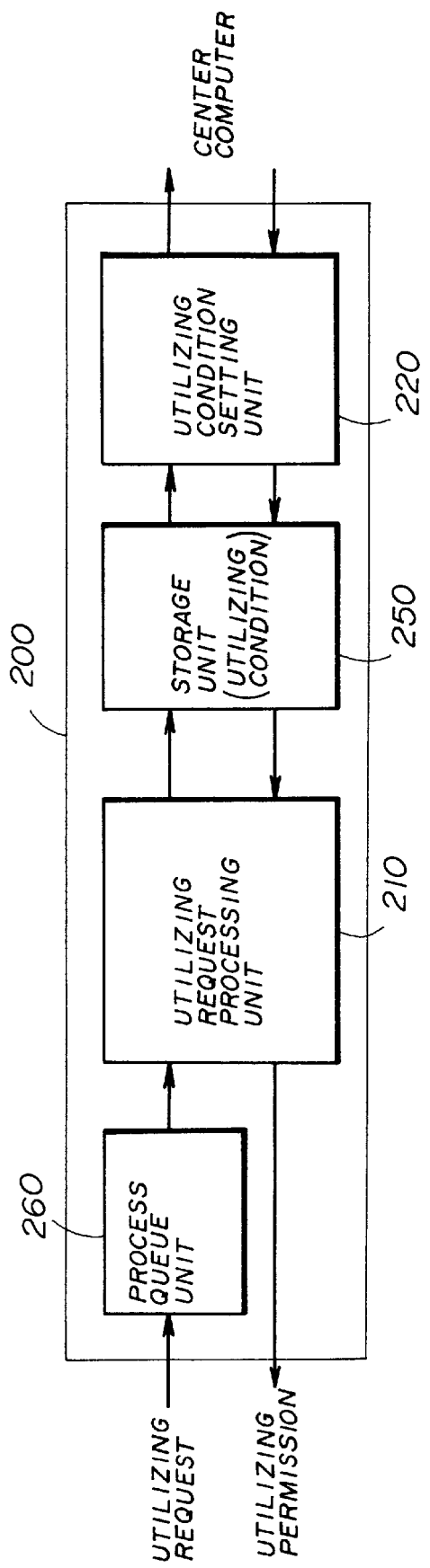
FIG. 11 is a block diagram illustrating a second example of a functional structure of the accounting server.

The accounting server 200 may also have a functional structure as shown in FIG. 11. In this example, a utilizing request from a user computer is prevented from being rejected by the accounting server 200 while the accounting server 200 is carrying out the process in response to a utilizing request from another user computer.

Referring to FIG. 11, the accounting server 200 has the utilizing request processing unit 210, the utilizing condition setting unit 220 and the storage unit 250 in the same manner as in the previous cases. The accounting server 200 further has a process queue unit 260 which is coupled to the utilizing request processing unit 210. The process queue unit 260 temporarily maintains the utilizing request (which may include the ciphered contents) in a waiting state. The process queue unit 260 can be formed using a FIFO memory unit and a function of the CPU 10.

In the accounting server 200, first, a utilizing request from a user computer is set in the process queue unit 260. While the utilizing request processing unit 210 is carrying out the process (see FIG. 8 and FIG. 10), the utilizing request is maintained in the waiting state by the process queue unit 260. When the process in the utilizing request processing unit 210 is terminated, the utilizing request which is maintained in the waiting state by the process queue unit 260 is supplied to the utilizing request processing unit 210.

In a case where a plurality of utilizing requests are maintained by the process queue unit 260 in the waiting state, the utilizing requests are successively supplied to the utilizing request processing unit 20 in the order in which the utilizing requests have been supplied to the process queue unit 260.

According to the accounting server 200 having the process queue unit 260, while the accounting server 200 is carrying out the process in response to a utilizing request from a user computer, the accounting server 200 can receive a utilizing request from another user computer. As a result, a situation in which a utilizing request from a user computer is suddenly rejected is substantially avoided. Thus, a convenient system can be formed.

In the above example (see FIGS. 7 and 8), each of the user computers transmits a utilizing request and ciphered contents to the accounting server 200. In the accounting server 200, the ciphered contents are decipher to permit the contents to be utilized. The utilizing permissive message and the deciphered contents are transmitted to the user computer in response to the utilizing request. In the accounting server 200, it takes a lot of time to decipher the contents, so that the account processing unit 212 (formed of the utilizing condition checking block 212a and the utilizing condition updating block 212b) does not efficiently operate. To eliminate this disadvantage, the accounting server 200 may have a functional structure as shown in FIG. 12.

Figure 12:
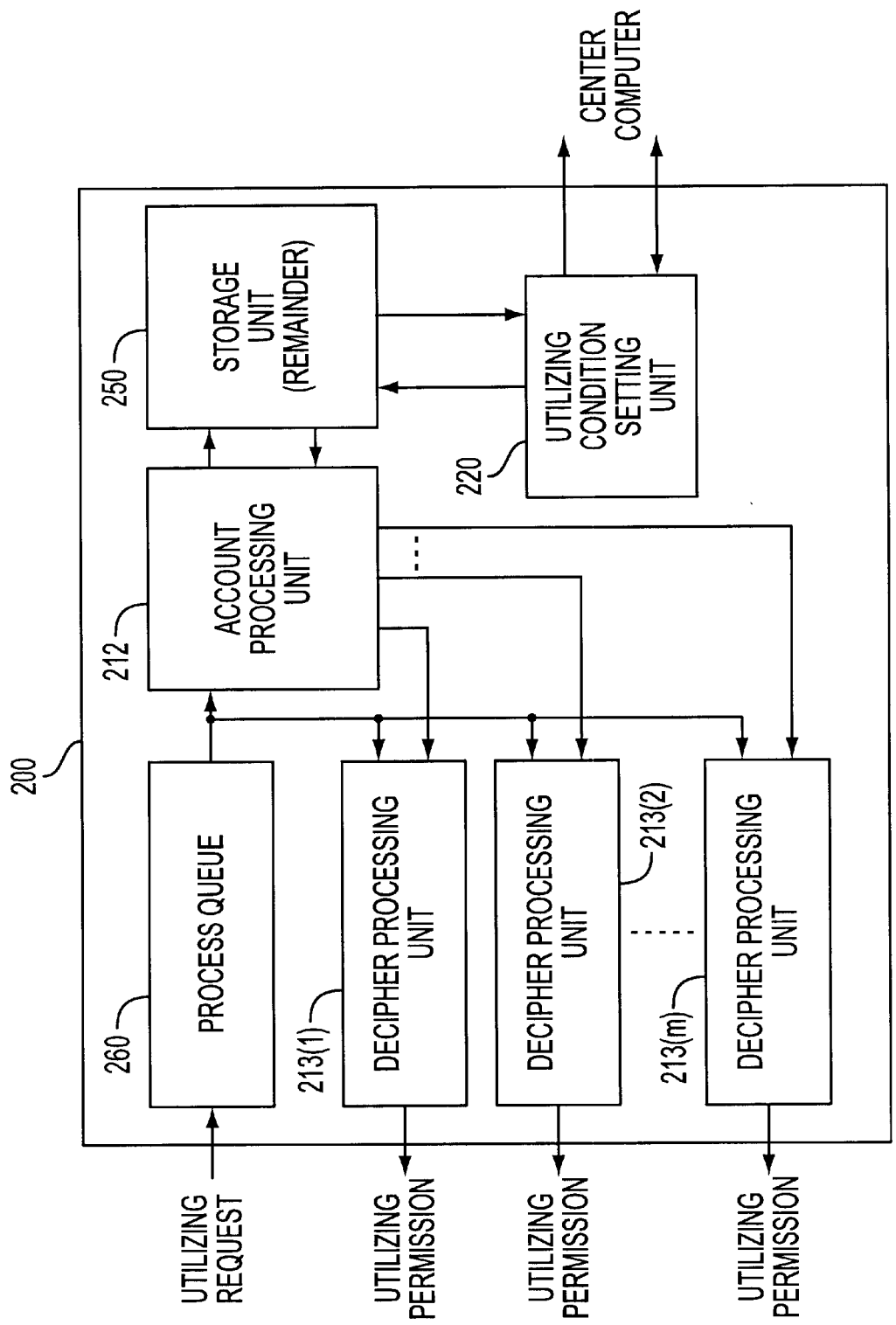
FIG. 12 is a block diagram illustrating a third example of a functional structure of the accounting server.

Referring to FIG. 12, the accounting server 200 has the process queue unit 260, the utilizing condition setting unit

220 and the storage unit 250 in the same manner as in the case shown in FIG. 11. The accounting server 200 further has the account processing unit 212 and a plurality of decipher processing units 213(1), 213(2), . . . and 213($m$). The account processing unit 212 and the plurality of decipher processing units 213(1), 213(2), . . . and 213($m$) correspond to the utilizing request processing unit 210 shown in FIG. 11. The account processing unit 212 is formed of the utilizing condition checking block 212$a$ and the utilizing condition updating block 212$b$ in the same manner as in the case shown in FIG. 9.

The plurality of decipher processing units 213(1), 213(2), . . . and 213($m$) are connected to the process queue unit 260 in parallel. An ID of the contents referring to the utilizing request is supplied from the process queue unit 260 to the account processing unit 212. It is determined, based on the utilizing condition of the contents, whether the contents can be utilized (the utilizing permission/utilizing nonpermission). If it is determined that the contents can be utilized, the ciphered contents referring to the utilizing request are supplied to one of the plurality of decipher processing units 213($i$) ($i$=1, 2 . . . ,$m$). A key used to decipher the ciphered contents is supplied to a decipher processing unit to which the ciphered contents are supplied. As a result, the ciphered contents are deciphered using the key.

Even if the process for decipher the contents is being performed in a decipher processing unit 213($i$), an ID of contents referring to the next utilizing request is supplied from the process queue unit 260 to the account processing unit 212. It is then determined whether the contents referring to the next utilizing request can be utilized. When it is determined that the contents can be utilized, the ciphered contents and a key used to decipher the ciphered contents is supplied from the process queue unit 260 to another decipher processing unit 213($j$). As a result, in a state where the decipher processing unit 213($i$) deciphering the contents, the decipher processing unit 213 can deciphers the other contents.

In an accounting server 200 having a plurality of decipher processing units, processes for deciphering the contents can be performed in parallel. Thus, even when utilizing requests for the contents are supplied from a plurality of user computers in parallel, responses to the utilizing request can be efficiently transmitted to corresponding user computers.

In a case where each of the decipher processing units is hardware, a plurality of decipher processing circuits are mounted in the accounting server 200. In a case where each of the decipher processing units is software, a plurality of processes for deciphering contents which can be activated in parallel are included in the program for the contents utilizing management.

The process queue unit 260 described above may be formed as shown in FIG. 13.

Figure 13:
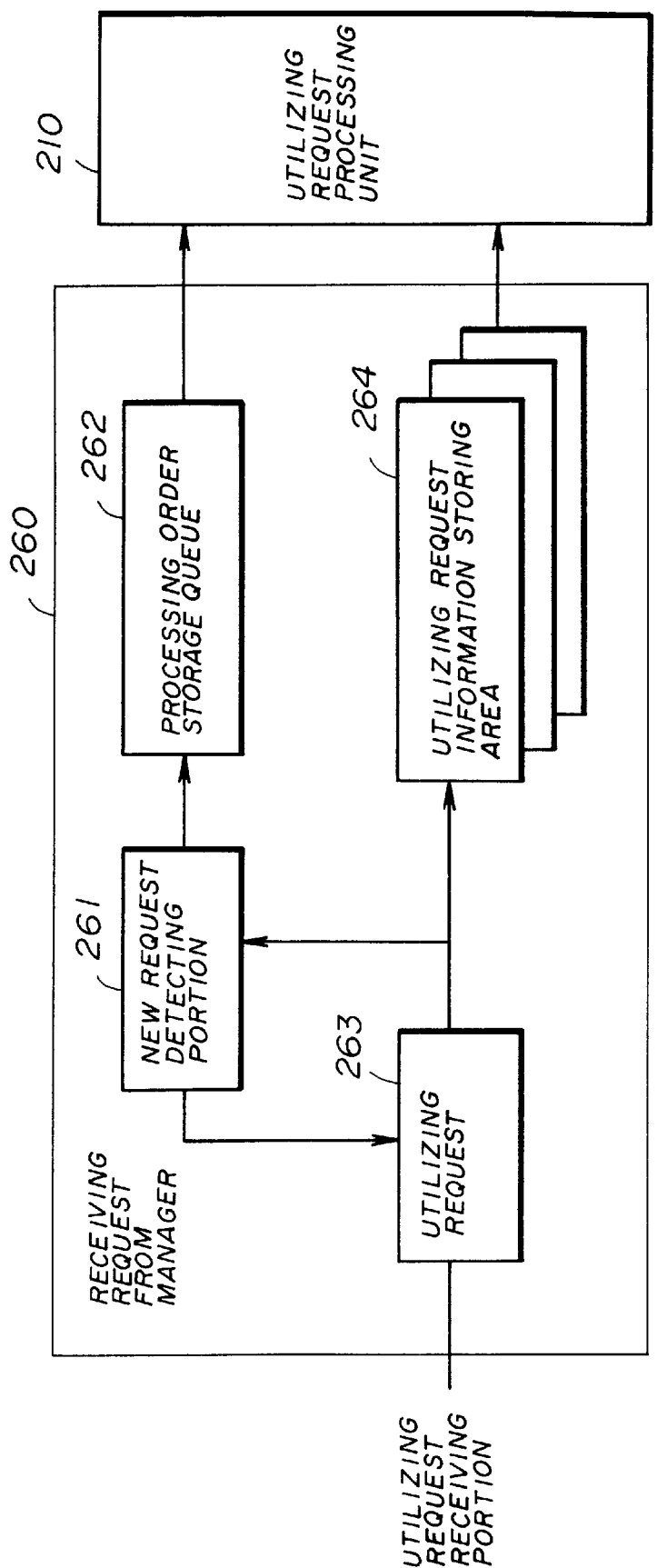
FIG. 13 is a block diagram illustrating an example of a functional structure of a process queuing unit of the accounting server shown in each of FIGS. 11 and 12.

Referring to FIG. 13, the process queue unit 260 has a new request detecting portion 261, a processing order storage queue 262, a utilizing request receiving portion 263 and a utilizing request information storing area 264. The new request detecting portion 261 detects that the utilizing request receiving portion 263 has received a utilizing request from a user computer and issues a request order number identifying the received utilizing request. The request order number issued by the new request detecting portion 261 is stored in the processing order storage queue 262.

In addition, information (a contents ID, ciphered contents and the like) referring to the utilizing request is stored in the utilizing request information storing area 264. The request order numbers are supplied from the processing order storage queue 262 to the utilizing request processing unit 210 one by one in the order in which they have been stored. The utilizing request processing unit 210 reads out of the utilizing request information storing area 264 information referring to the utilizing request corresponding to a request order number supplied thereto. The utilizing request processing unit 210 determines, based on the information (a contents ID, ciphered contents and the like) referring to the utilizing request, whether the contents can be utilized, in the same manner as in the case described above.

In a case where the length of information referring to the utilizing request is limited to a maximum length corresponding to the capacity of a memory, contents having a length greater than the maximum length have to be divided into parts. In this case, utilizing requests for the respective parts of the contents are separately supplied from a user computer to the accounting server 200. The utilizing requests for the respective parts of the contents are provided with the same request order number in the accounting server 200. It is determined whether each of the utilizing requests for the respective parts of the contents is a new request. Each of the utilizing requests has a format including information (e.g., a flag) indicating whether or not it is a new request.

If it is determined that a utilizing request is a new request, a new request order number is issued for the utilizing request, and the new request order number is stored in the processing order storage queue 262. A corresponding part of the information (the contents) referring to the utilizing request (the new request) is then stored in the utilizing request information storing area 264. Other parts of the information referring to other utilizing requests are stored in the utilizing request information area 264 in a state where the part of the information referring to the new request is linked to the other parts of the information referring to the other utilizing requests.

When a request order number corresponding to the new request is read out from the processing order storage queue 262, the part of the information referring to the new request is further read out from the utilizing request information storing area 264. The information is supplied to the utilizing request processing unit 210. The utilizing request processing unit 210 performs the process based on the new request. After this, other parts of the information linked to the part of the information referring to the new request are read out of utilizing request information storing area 264 and supplied to the utilizing request processing unit 210. The utilizing request processing unit 210 then performs the process based on the utilizing requests for the other parts of the information (the contents).

After all parts of the information referring to the utilizing requests including the new request are completely stored in the utilizing request information storing area 264, the process for each of the parts of the information may start from a process for the part referring to the new request. Each time a part of the information referring to a utilizing request is stored in the utilizing request information storing area 264, the process for the part of the information may start.

In the process queue unit 260 having the above structure, the new request detecting portion 261 is checking the number of request order numbers stored in the processing order storage queue 262. When the number of request order numbers reaches a predetermined maximum value, the new request detecting portion 261 controls the utilizing request receiving portion 263 so that the operations of the utilizing request receiving portion 263 is suspended. As a result, in a state where the number of request order numbers is equal to the predetermined maximum value, the utilizing request receiving portion 263 does not receive any utilizing request.

As has been described above, since the processing order storage queue 262 and the utilizing request information area 264 are provided in the process queue unit 260, the process for the information having a large length can be efficiently performed. In addition, when the number of processing order numbers stores in the processing order storage queue 262 reaches the maximum value, it is suspended to receive a new utilizing request. Thus, the utilizing request information storing area 264 in which information referring to utilizing requests is stored is prevented from overflowing.

In the accounting server 200, the process for resetting the respective utilizing conditions (increasing the permissible number of utilizing times and updating the permissible utilizing term) can be performed in accordance with instructions from only a manager of the accounting server 200 (see steps 5, 1 and 2 in FIG. 5). While the process for resetting a utilizing condition is being performed in accordance with an instruction from the manager, a utilizing request may be received from a user computer so that the utilizing condition is changed (the permissible number of utilizing times is decreased by one). In this case, the process for resetting the utilizing condition may not be normally performed. Thus, CPU 10 performs the process for resetting the utilizing condition in accordance with a procedure as shown in FIG. 14.

Figure 14:
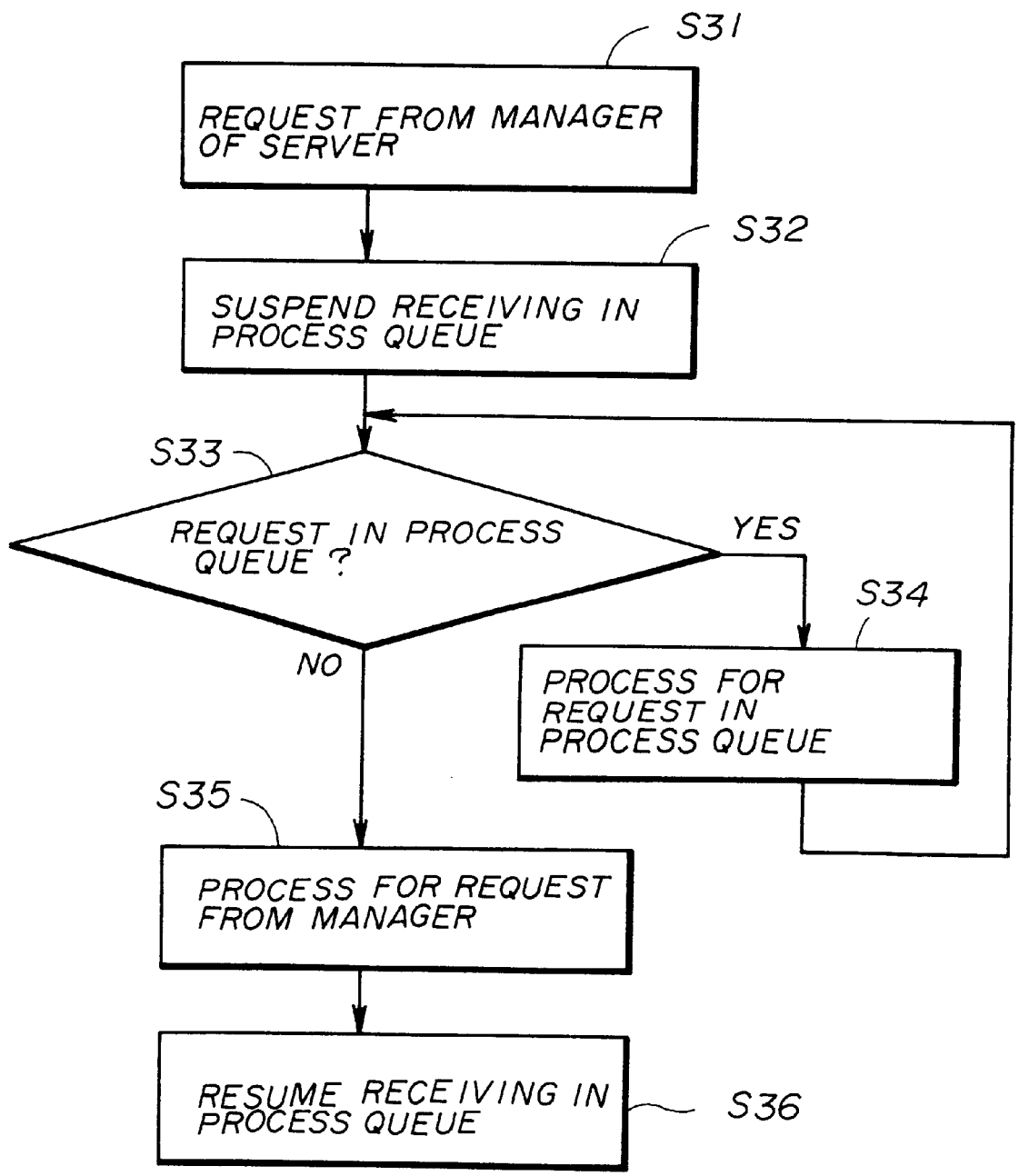
FIG. 14 is a flowchart illustrating a procedure of a process for changing a contents utilizing condition in response to a request from an operator of the accounting server.

Referring to FIG. 14, if a request for the process for resetting the utilizing condition is received from the manager of the accounting server 200 (S31), the CPU 10 outputs a suspending instruction to the process queue (S32). The suspending instruction is supplied to the utilizing request receiving portion 262 of the process queue unit 260 shown in FIG. 13. As a result, all utilizing requests from user computers are rejected. The CPU 10 determines whether utilizing requests to be processed remain in the process queue unit 260 (S33). If utilizing requests to be processed remain in the process queue unit 260, the utilizing requests are successively supplied to the utilizing request processing unit 210 in the order in which the utilizing requests have been stored in the process queue unit 260. The utilizing request processing unit 210 determines whether contents referring to each utilizing request can be utilized (S34; the process shown in FIG. 8 or FIG. 10).

If the processes for all the utilizing requests stored in the process queue unit 260 have been completed when the receiving of the utilizing request is suspended, the CPU 10 performs the process for resetting the utilizing condition of contents in accordance with the request from the manager (S35). After the process for the resetting of the utilizing condition is completed, the CPU 10 supplies to the utilizing request receiving portion 263 a releasing instruction to release a state where the receiving of the utilizing request is suspended (S36). As a result, the accounting server 200 resumes receiving utilizing requests for contents from the user computers.

According to the process described above, after the receiving of the utilizing request is suspended, processes for the remaining utilizing requests in the process queue unit 260 are completed. After this, the process for resetting the utilizing condition is performed in response to the request from the manager. Thus, a user computer which has transmitted a utilizing request to the accounting server 200 before the receiving of the utilizing request is suspended can normally receive a response (the utilizing permission or the utilizing nonpermission) to the utilizing request from the accounting server 200.

The present invention is not limited to the aforementioned embodiments, and other variations and modifications may be made without departing from the scope of the claimed invention.

What is claimed is:

1. A contents utilizing management apparatus, comprising:

utilizing condition storing means for storing a utilizing condition corresponding to a sum of money of purchased authorization for use of the contents, wherein the utilizing condition stored in said utilizing condition storing means comprises an accumulative time of utilization for the contents;

a determination means, coupled to a plurality of computers in which the contents are utilized, for determining whether the contents can be utilized based on the utilizing condition of the contents referred to by a utilizing request supplied from one of said plurality of computers;

utilizing permission means for supplying permission to utilize the contents to the one of said plurality of computers when said determination means determines that the contents can be utilized; and updating means for updating the accumulative time of utilization so that an amount of utilization of the contents is subtracted from the accumulative time of utilization for the contents when said determination means determines that the contents can be utilized, wherein the updated accumulative time of utilization is used to determine, in response to a next utilizing request for the contents, whether the contents can be utilized.

2. The contents utilizing management apparatus as claimed in claim 1, wherein said utilizing permission means has deciphering means for deciphering ciphered contents referred to by the utilizing request, the deciphered contents being supplied as the permission to utilize the contents to the one of said plurality of computers in response to the utilizing request.

3. The contents utilizing management apparatus as claimed in claim 2, wherein said deciphering means has a plurality of deciphering units which decipher ciphered contents in parallel.

4. The contents utilizing management apparatus as claimed in claim 1, wherein said utilizing permission means has means for supplying the permission to utilize the contents, and a key used to decipher the ciphered contents referred to by the utilizing request, to the one of said plurality of computers.

5. The contents utilizing management apparatus as claimed in claim 1, further comprising:

utilizing request queue means for successively storing utilizing requests from said plurality of computers, wherein said determination means determines, based on the utilizing condition of the contents referred to by each of the utilizing requests successively supplied from said utilizing request queue means, whether the contents can be utilized.

6. The contents utilizing management apparatus as claimed in claim 5, wherein said utilizing request queue means comprises:

means for issuing processing order numbers respectively identifying utilizing requests from said plurality of computers;

queue storing means for successively storing the processing order numbers issued by said means; and utilizing request information storing means for storing information of the contents referred to by the utilizing requests from said plurality of computers, wherein said determination means reads out of said utilizing request information storing means information of the contents referred to by a utilizing request identified by each of the processing order numbers from said queue storing means, and determines, based on a utilizing condition corresponding to the information read out from said utilizing request information storing means, whether the contents can be utilized.

7. The contents utilizing management apparatus as claimed in claim 5, further comprising:

suspending means for suspending receipt of the utilizing request from each of said plurality of computers when the utilizing condition of the contents stored in said utilizing condition storing means is changed; and changing control means for starting a process for changing the utilizing condition of the contents stored in said utilizing condition storing means to a new utilizing condition, after said determination means completely determines, in a state where said suspending means suspends the receipt of the utilizing requests from each of said plurality of computers, whether the contents referred to by all the utilizing requests which have been stored in said utilizing request queue means can be utilized.

8. The contents utilizing management apparatus as claimed in claim 1, further comprising:

suspending means for suspending receipt of the utilizing request from each of said plurality of computers until stored the utilizing condition is completely changed to a new utilizing condition when the utilizing condition of the contents stored in said utilizing condition storing means is changed.

9. The software license protection apparatus as claimed in claim 1, wherein said utilizing permission unit means includes a deciphering unit to decipher ciphered contents referred to by the utilizing request, the deciphered contents being supplied as the permission to utilize the contents to the one of said plurality of computers in response to the utilizing request.

10. A contents utilizing system, comprising:

a plurality of computers in which contents are utilized; and a contents utilizing management apparatus, connected to said plurality of computers by a local network and connected to a central computer by a predetermined network, for managing utilization of the contents in each of said plurality of computers based on a utilizing condition corresponding to a sum of money of purchased authorization of the contents, said utilizing condition supplied from said central computer, said contents utilizing management apparatus comprising:

utilizing condition storing means for storing the utilizing condition corresponding to the sum of money of the purchased authorization of the contents, wherein the utilizing condition stored in the utilizing condition storing means of said contents utilizing management apparatus comprises an accumulative time of utilization for the contents;

determination means, coupled to said plurality of computers in which the contents are utilized, for determining, based on the utilizing condition of the contents referred to by a utilizing request supplied from one of said plurality of computers, whether the contents can be utilized;

utilizing permission means for supplying permission to utilize the contents to the one of said plurality of computers when said determination means determines that the contents can be utilized; and updating means for updating the amount of accumulative time of utilization such that an amount of utilization of the contents is subtracted from the amount of accumulative time of utilization for the contents when said determination means determines that the contents can be utilized, wherein the updated amount of accumulative time of utilization is used to determine, in response to a next utilizing request for the contents, whether the contents can be utilized.

11. The contents utilizing system as claimed in claim 10, wherein said utilizing permission means of said contents utilizing management apparatus has deciphering means for deciphering ciphered contents referred to by the utilizing request, the deciphered contents being supplied as the permission to utilize the contents to the one of said plurality of computers in response to the utilizing request.

12. The contents utilizing system as claimed in claim 11, wherein said deciphering means of said contents utilizing management apparatus has a plurality of deciphering units which decipher ciphered contents in parallel.

13. The contents utilizing system as claimed in claim 10, wherein said utilizing permission means of said contents utilizing management apparatus has means for supplying the permission to utilize the contents and a key used to decipher the ciphered contents referred to by the utilizing request, to the one of said plurality of computers.

14. The contents utilizing system as claimed in claim 10, wherein said contents utilizing management apparatus further comprises:

utilizing request queue means for successively storing utilizing requests from said plurality of computers, wherein said determination means determines, based on the utilizing condition of the contents referred to by each of the utilizing requests successively supplied from said utilizing request queue means, whether the contents can be utilized.

15. The contents utilizing system as claimed in claim 14, wherein said utilizing request queue means of said contents utilizing management apparatus comprises:

issuing means for issuing processing order numbers respectively identifying utilizing requests from said plurality of computers;

queue storing means for successively storing the processing order numbers issued by said issuing means; and utilizing request information storing means for storing information of contents referred to by the utilizing requests from said plurality of computers, wherein said determination means reads out of said utilizing request information storing means information of the contents by referring to a utilizing request identified by each of the processing order numbers from said queue storing means, and determines, based on a utilizing condition corresponding to the information read out from said utilizing request information storing means, whether the contents can be utilized.

16. The contents utilizing system as claimed in claim 14, wherein said contents utilizing management apparatus further comprises:

suspending means for suspending receipt of the utilizing request from each of said plurality of computers when the utilizing condition of the contents stored in said utilizing condition storing means is changed; and changing control means for starting a process for changing the utilizing condition of the contents stored in said utilizing condition storing means to a new utilizing condition, after said determination means completely determines, in a state where said suspending means suspends the receipt of the utilizing requests from each of said plurality of computers, whether the contents referred to by all the utilizing requests which have been stored in said utilizing request queue means can be utilized.

17. The contents utilizing system as claimed in claim 10, wherein said contents utilizing management apparatus further comprises:

suspending means for suspending receipt of the utilizing request from each of said plurality of computers until the stored utilizing condition is completely changed to a new utilizing condition when the utilizing condition of the contents stored in said utilizing condition storing means is changed.

18. A software license protection apparatus, comprising:

a storage unit to store a utilizing condition corresponding to a sum of money of purchased authorization for use of contents, wherein the utilizing condition stored in said storage unit comprises an accumulative time of utilization for the contents;

a determination unit coupled to a plurality of computers in which the contents are utilized, to determine, based on the utilizing condition of the contents referred to by a utilizing request supplied from one of said plurality of computers, whether the contents can be utilized;

a permission unit to supply permission to utilize the contents to the one of said plurality of computers when said determination unit determines that the contents can be utilized; and an update unit to update the accumulative time of utilization so that an amount of utilization of the contents is subtracted from the accumulative time of utilization for the contents when said determination unit determines that the contents can be utilized, wherein the updated accumulative time of utilization is used to determine, in response to a next utilizing request for the contents, whether the contents can be utilized.

19. The software license protection apparatus according to claim 18, wherein the utilizing condition comprises a permissible term of utilization for the contents, said update unit updates the permissible term of utilization so that an amount of utilization of the contents is subtracted from the permissible term of utilization for the contents when said determination unit determines that the contents can be utilized, and the updated permissible term of utilization is used to determine whether the contents can be utilized in response to a next utilizing request for the contents.

20. A software license protection apparatus, comprising:

a storage unit storing a utilizing condition, the utilizing condition comprising an available usage time for utilization of a content;

a determination unit, coupled to a plurality of computers in which the content is utilized, determining whether the content can be utilized based on a utilizing condition;

a permission unit supplying permission to utilize the content to one of the plurality of computers when the determination unit determines that the content can be utilized; and an update unit updating the available usage time for utilization so that an amount of utilization of the content is subtracted from the available usage time for utilization of the content when said determination unit determines that the content can be utilized, wherein the updated available usage time for utilization is used to determine whether the content can be utilized in response to a next utilizing request for the content.

\* \* \* \* \*